(12) United States Patent
Kaneichi et al.

(10) Patent No.: US 11,631,095 B2
(45) Date of Patent: Apr. 18, 2023

(54) INFORMATION PROCESSING METHOD AND INFORMATION PROCESSING APPARATUS

(71) Applicant: Toyota Jidosha Kabushiki Kaisha, Toyota (JP)

(72) Inventors: Daiki Kaneichi, Nisshin (JP); Takahiro Shiga, Chiryu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 190 days.

(21) Appl. No.: 17/010,444

(22) Filed: Sep. 2, 2020

(65) Prior Publication Data

US 2021/0065225 A1   Mar. 4, 2021

(30) Foreign Application Priority Data

Sep. 3, 2019   (JP) .............................. JP2019-160542

(51) Int. Cl.
*G06Q 30/02* (2012.01)
*G06F 16/28* (2019.01)
(Continued)

(52) U.S. Cl.
CPC ....... *G06Q 30/0205* (2013.01); *G06F 16/285* (2019.01); *G06N 20/00* (2019.01); *G06Q 50/30* (2013.01)

(58) Field of Classification Search
CPC .. G06Q 30/0205; G06Q 50/30; G06F 16/285; G06N 20/00
(Continued)

(56) References Cited

U.S. PATENT DOCUMENTS

| 2009/0024407 A1* | 1/2009 | Shan | ................... G06Q 30/0202 705/348 |
| 2012/0209658 A1* | 8/2012 | Shibayama | ............ G06Q 10/10 705/7.29 |
| 2019/0227847 A1* | 7/2019 | Jha | ........................ G06N 3/0454 |

FOREIGN PATENT DOCUMENTS

| JP | 2014176150 A | * | 9/2014 |
| JP | 2019-109648 A |  | 7/2019 |

OTHER PUBLICATIONS

Teresa Cristobal "Applying Time-Dependent Attributes to Represent Demand in Road Mass Transit Systems" MDPI, Published online Feb. 20, 2018. doi: 10.3390/e20020133 (Year: 2018).*

(Continued)

*Primary Examiner* — Abdallah A El-Hage Hassan
(74) *Attorney, Agent, or Firm* — Dinsmore & Shohl LLP

(57) ABSTRACT

An information processing method which is performed by an information processing apparatus for forecasting demand for a service provided by a mobile vehicle, comprises a classification step of classifying a plurality of unit regions included in a first area into a plurality of categories, respectively, by using a first classification model; a first building step of building a first demand forecasting model by determining a first set of parameters to be applied to each of the plurality of categories based on the classified categories and track record data in the first area; a second building step of building a second classification model by using classification criteria possessed by the first classification model, and building a second demand forecasting model by using the first set of parameters; and a forecasting step of performing demand forecasting in a second area by using the second classification model and the second demand forecasting model.

6 Claims, 9 Drawing Sheets

(51) Int. Cl.
　　　*G06N 20/00*　　　　　(2019.01)
　　　*G06Q 50/30*　　　　　(2012.01)
　　　*G06Q 30/0204*　　　　(2023.01)

(58) Field of Classification Search
　　　USPC ....................................................... 705/7.34
　　　See application file for complete search history.

(56) References Cited

OTHER PUBLICATIONS

Shuo Lei, "Forecasting car rental demand based temporal and spatial travel patterns" | IEEE Conference Publication (Year: 2017).*
Jintao Ke, "Hexagon-Based Convolutional Neural Network for Supply-Demand Forecasting of Ride-Sourcing Services" IEEE Transactions on Intelligent Transportation Systems, vol. 20, No. 11, Nov. 2018.*

* cited by examiner

TRACK RECORD DATA

| TRACK RECORD ID | TYPE | PURCHASED GOODS | NUMBER OF PIECES | SALES AMOUNT | ... |
|---|---|---|---|---|---|
| A001 | MOBILE SALES | XXX | XXX | XXX YEN | ... |
| A002 | MOBILE SALES | XXX | XXX | XXX YEN | ... |
| A003 | MOBILE SALES | XXX | XXX | XXX YEN | ... |
| ... | | | | | |

FIG. 3A

AREA DATA

| MESH ID | TYPE | BUILDING 1 | | | | BUILDING n | ... |
| | | TYPE | ACCOMMO-DATION NUMBER | NUMBER OF FLOORS | BUILDING AREA | | |
|---|---|---|---|---|---|---|---|
| M001 | URBAN AREA | RAILROAD STATION | 3000 | ... | ... | ... | ... |
| M002 | URBAN AREA | PUBLIC FACILITY | 4500 | ... | ... | ... | ... |
| M003 | URBAN AREA | HOSPITAL | 300 | ... | ... | ... | ... |
| ... | | | | | | | |

FIG. 3B

GENERAL DATA

| DATE | DAY OF WEEK | TIME ZONE | WEATHER | MESH ID | TRACK RECORD ID | TRAFFIC VOLUME | |
| | | | | | | TIME ZONE A | TIME ZONE B |
|---|---|---|---|---|---|---|---|
| 2019/7/1 | MONDAY | 13:00-14:00 | CLOUDY | M001 | A001 | ... | ... |
| 2019/7/1 | MONDAY | 14:00-15:00 | CLOUDY | M001 | A002 | ... | ... |
| 2019/7/1 | MONDAY | 15:00-16:00 | CLOUDY | M001 | A003 | ... | ... |

FIG. 3C

INFORMATION PROCESSING METHOD AND INFORMATION PROCESSING APPARATUS

CROSS REFERENCE TO RELATED APPLICATION

This application claims the benefit of Japanese Patent Application No. 2019-160542 filed on Sep. 3, 2019 which is hereby incorporated by reference herein in its entirety.

BACKGROUND

Technical Field

The present disclosure relates to a technique for forecasting demand.

Description of the Related Art

Studies are being conducted on providing services by using mobile vehicles. For example, the convenience of shopping can be improved by dispatching an autonomous mobile vehicle (mobile shop vehicle), which functions as a mobile shop, to the side of users. In addition, the convenience of transportation can be improved by operating omnibuses or coaches capable of performing autonomous traveling.

In cases where operations are conducted by such mobile vehicles, it is useful to forecast the demand to be generated, and to decide the place of arrangement and sales structure of each mobile vehicle. The forecasting of the demand can be made by using a machine learning algorithm, for example, as disclosed in Patent Literature 1.

CITATION LIST

Patent Literature

Patent Literature 1: Japanese Patent Application Laid-open Publication No. 2019-109648

SUMMARY

A model for performing machine learning can be made to learn by using data (purchase data, etc.) obtained at the time when a service has been utilized in the past. However, there is a problem that sufficient accuracy of forecasting cannot be obtained in cases where an attempt is made to forecast demand with respect to an area where no service has been provided.

The present disclosure has been made in consideration of the problem as referred to above, and has for its object to perform demand forecasting for a service in an area where the service has not yet been provided, with a high degree of accuracy.

The present disclosure in its one aspect provides an information processing method which is performed by an information processing apparatus for forecasting demand for a service provided by a mobile vehicle. The method comprises a classification step of classifying a plurality of unit regions included in a first area into a plurality of categories, respectively, by using a first classification model; a first building step of building a first demand forecasting model by determining a first set of parameters to be applied to each of the plurality of categories based on the classified categories and track record data in the first area; a second building step of building a second classification model by using classification criteria possessed by the first classification model, and building a second demand forecasting model by using the first set of parameters; and a forecasting step of performing demand forecasting in a second area by using the second classification model and the second demand forecasting model.

The present disclosure in its another aspect provides an information processing apparatus for forecasting demand for a service provided by a mobile vehicle. The apparatus including a control unit that performs classifying a plurality of unit regions included in a first area into a plurality of categories, respectively, by using a first classification model; building a first demand forecasting model by determining a first set of parameters to be applied to each of the plurality of categories based on the classified categories and track record data in the first area; building a second classification model by using classification criteria possessed by the first classification model, and building a second demand forecasting model by using the first set of parameters; and performing demand forecasting in a second area by using the second classification model and the second demand forecasting model.

In addition, a further aspect of the present disclosure resides in a program for allowing a computer to execute an information processing method that is performed by the above-mentioned information processing apparatus, or a computer readable storage medium having the program stored therein in a non-transitory manner.

According to the present disclosure, demand forecasting in an area without the provision track record of a service can be performed with a high degree of accuracy.

BRIEF DESCRIPTION OF THE DRAWINGS

FIG. 3A is a view explaining track record data stored in a data storage unit.

FIG. 3B is a view explaining area data stored in the data storage unit.

FIG. 3C is a view explaining general data stored in the data storage unit.

DESCRIPTION OF THE EMBODIMENTS

Figure 1:
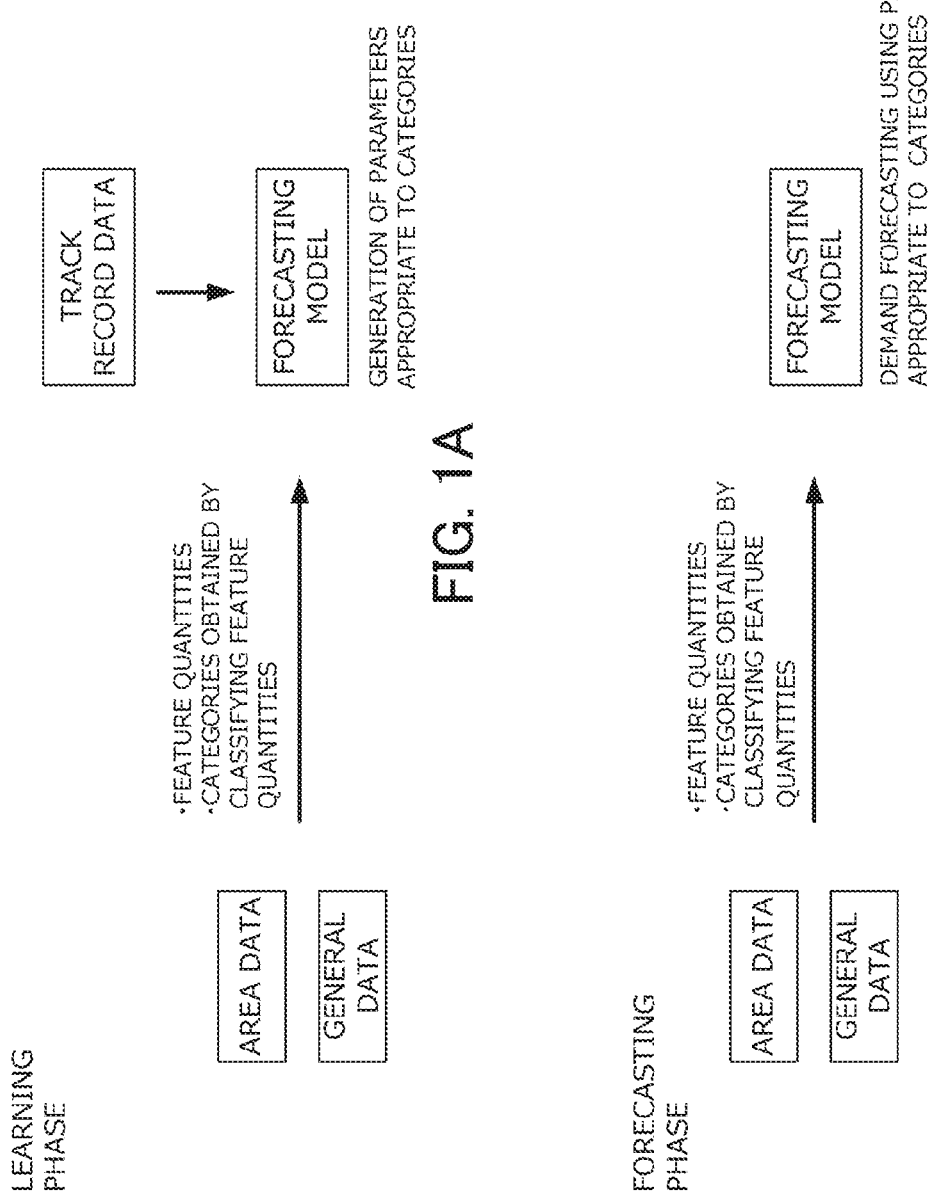
FIG. 1A is a view illustrating an outline of a learning phase demand forecasting by machine learning.
FIG. 1B is a view illustrating an outline of a forecasting phase demand forecasting by machine learning.

There can be considered a mode in which services are provided by a mobile vehicle capable of autonomous driving. For example, a mobile shop vehicle with facilities and equipment for shop operations in the vehicle may be dispatched to a predetermined area to deploy the facilities and equipment to conduct operations. In addition, transportation services for passengers and luggage can also be provided by mobile vehicles capable of autonomous driving.

The area or point where an autonomous mobile vehicle with a shop function will operate, and the place where an autonomous mobile vehicle having a function of transporting freight and passengers will be dispatched, can be decided on the basis of demand. For example, it is possible to forecast how much demand will be generated under a certain condition by performing machine learning using data on the feature, weather, time of day, etc., of a target area, and data on actually generated demand (e.g., data indicating sales, hereinafter referred to as "track record data").

However, it may not be possible to perform demand forecasting using machine learning in areas where no service has been provided at all, such as areas where new services are being launched. Here, it may be possible to build a machine learning model based on data generated in a proven area, but in cases where the feature of an area is different, expected results may not always be obtained.

In order to cope with this, in an embodiment, provision is made for an information processing method of forecasting the demand for a service that is provided by a mobile vehicle.

Specifically, a first demand forecasting model is built by classifying a plurality of unit regions included in a first area into a plurality of categories using a first classification model, and determining a first set of parameters to be applied to each of the plurality of categories based on the classified categories and track record data in the first area.

Then, a second classification model is built by using classification criteria of the first classification model, and a second demand forecasting model is built by using the first set of parameters, so that demand forecasting in a second area is performed by using the second classification model and the second demand forecasting model.

Here, note that a service may be anything that provides value to a consumer, such as a service that provides transportation, a service that provides resources, a service that provides space, a service that sells goods, etc.

The first area is an area in which a service has been provided, and the second area is an area in which the service is not provided.

First, a plurality of unit regions included in the first area are classified into a plurality of categories. This is because a forecasting method for demand varies largely depending on the feature of each unit region. Then, based on the track record data in the first area, a set of weights (first set of parameters) for forecasting the demand is generated for each of the plurality of categories.

The set of weights thus generated is specific to the categories generated in the first area, and hence, a problem may arise if the same processing is attempted for the second area.

Accordingly, in a method according to this embodiment, the second classification model is built by using the classification criteria that the first classification model has used at the time of classifying the unit regions included in the first area into the categories. In addition, the first set of parameters is used to build a model for performing demand forecasting in the second area.

According to such a configuration, the unit regions can be classified into the categories according to the same criteria in the first area and the second area. That is, demand forecasting in the second area can be started by making use of a set of weights specific to the categories as it is.

Here, note that the first classification model may be characterized in that the classification is performed based on a plurality of factors associated with facilities and/or buildings included in the unit regions.

By performing the category classification according to the factors associated with the facilities and/or buildings where consumers gather, it is possible to express the features of the unit regions in an accurate manner.

In addition, a third demand forecasting model specific to the second area may be built by determining a second set of parameters to be applied to each of the plurality of categories based on the classified categories and the actual (or track record) data generated in the second area.

After a service has been started in the second area, the track record data is generated in the second area, so that an improvement in forecasting accuracy can be expected by building the forecasting model utilizing the track record data.

Moreover, it may be characterized in that when performing demand forecasting with respect to the second area, a ratio of utilization between the second demand forecasting model and the third demand forecasting model is changed based on the degree of accumulation of the track record data generated in the second area.

For example, in a period of time in which the track record data has not been sufficiently generated in the second area, the utilization ratio of the second demand forecasting model may be made large, but as the amount of track record data generated in the second area increases, the utilization rate of the third demand forecasting model may be made larger.

Further, it may also be characterized in that in cases where the track record data generated in the second area has been accumulated in a predetermined amount or more, a model to be utilized when performing demand forecasting with respect to the second area is switched over from the second demand forecasting model into the third demand podcasting mode.

Whether the track record data generated in the second area has been accumulated in the predetermined amount or more may be determined by a total amount of data, or may be determined by the number of times of learning performed based on the track record data (i.e., the number of times the third demand forecasting model has been updated).

First Embodiment

An outline of an information processing apparatus according to a first embodiment of the present disclosure will be described with reference to FIGS. 1A and 1B. The information processing apparatus according to this embodiment is an apparatus that builds a machine learning model (hereinafter, referred to as a "forecasting model") by using, as teacher (training) data, data representing a track record of having provided goods or a service (track record data), and forecasts how much demand is expected, by using the forecasting model thus obtained. The track record data refers to data representing a track record of goods or services, and includes, for example, the content, the number of pieces, etc., of the goods and services.

The forecasting model utilizes, as data for performing demand forecasting, data specific to areas in which goods or services are provided, and general data such as weather, time zones (times of day), etc. The former is called area data, and the latter is called general data. The area data is, for example, such that a target area is divided into meshes, and features for each mesh (e.g., the number and types of facilities and/or buildings existing in each mesh, the number of people allowed to stay there, etc.) are represented. The general data is, for example, the weather, temperature and target time zone of the target area, the number of people present in the target area, and so on. These area and general data are converted into feature quantities, and are used as explanatory variables.

In the example of FIG. 1A, in a learning phase, the feature quantities obtained from the area data and the general data (i.e., feature quantities as the background of the demand forecasting) are classified into categories, and then, a parameter (weight) is generated for each category. In the example of FIG. 1B, in a forecasting phase, the feature quantities given are classified into categories, and demand forecasting is carried out by utilizing parameters appropriate to the categories. Category classification can be performed by clustering, for example. Thus, it is possible to obtain the parameters optimized for each forecasting condition by performing the category classification and the parameter generation independently from each other.

However, several problems will arise in cases where demand forecasting is attempted to be made by such a method in areas where there is no track record data.

For example, consideration is given to a case where demand forecasting is made in a second area where a new service is launched, by making use of a forecasting model that has been learned by using track record data generated in a first area. In this case, because there is no actual or track record data in the second area, it may be considered that the forecasting model built using the track record data generated in the first area is appropriated.

However, the parameters (weights) of the forecasting model are specific to the categories generated by using the feature quantities corresponding to the first area, and hence, desired results cannot be obtained by appropriating the forecasting model alone. This is because the categories generated in performing the demand forecasting (the categories generated by using the feature quantities corresponding to the second area) are not always match the categories used at the time of learning (the categories generated by using the feature quantities corresponding to the first area). If there is a mismatch between the categories, it is not possible to perform the demand forecasting in a correct manner because inappropriate parameters will be applied.

In the following, an information processing apparatus 100 for solving this problem will be described.

Figure 2:
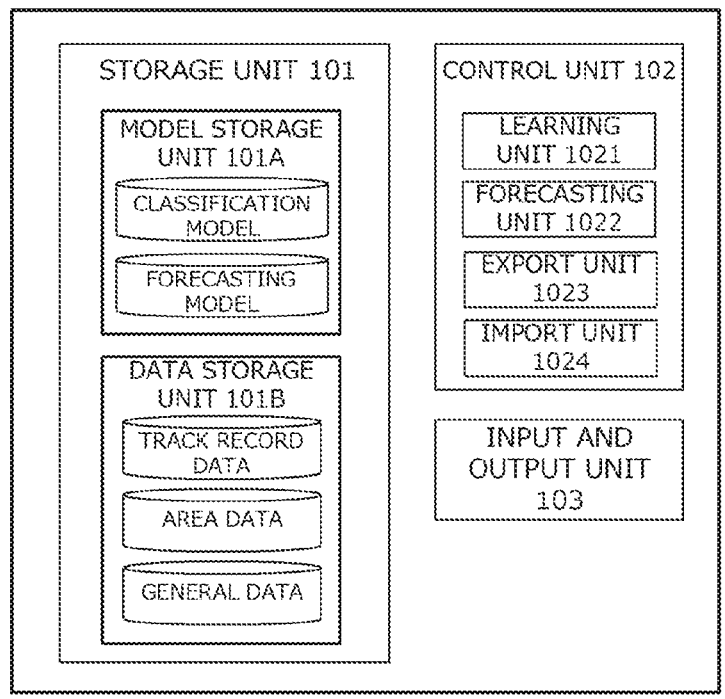
FIG. 2 is a schematic configuration view of an information processing apparatus according to a first embodiment of the present disclosure.

FIG. 2 is a block diagram schematically illustrating an example of the configuration of the information processing apparatus 100 for forecasting demand by using a machine learning algorithm.

The information processing apparatus 100 is composed of including a storage unit 101, a control unit 102, and an input and output unit 103. The information processing apparatus 100 is composed of a general computer having a processor and a memory.

The storage unit 101 is a unit configured to store data necessary to forecast demand. Specifically, the storage unit 101 is composed of including a model storage unit 101A to store a machine learning model, and a data storage unit 101B to store data for performing machine learning. In addition, the storage unit 101 can also store programs to be executed by the control unit 102, which will be described later, and data utilized by the programs. The storage unit 101 is composed of a storage medium such as a RAM, a magnetic disk, a flash memory or the like.

The model storage unit 101A stores the machine learning model.

In this embodiment, a classification model and a forecasting model are used as the machine learning model.

The classification model is a model to categorize information, which is the background of demand forecasting, into a plurality of categories. The category classification can be performed, for example, based on the feature quantities corresponding to the area data, and the feature quantities corresponding to the general data. The classification model generates classification criteria such as, for example, "A mesh that satisfies a geographical condition of Z when the weather condition is X and the time zone is Y is classified into category A."

In addition, the forecasting model is a model that assigns weights to a plurality of explanatory variables for each of the classified categories. These models start from an initial state, and are updated at any time throughout the learning phase.

A detailed learning method for each model will be described later.

The data storage unit 101B includes databases that store the track record data, the area data and the general data, respectively. These databases are built by a program(s) of a database management system (DBMS) executed by a processor to manage data stored in a storage device. The databases utilized in this embodiment are relational databases, for example.

Data for performing machine learning include the track record data, the area data and the general data, as mentioned above. These data may be obtained from the outside of the apparatus via a storage medium or network.

The track record data is data representing the actual result or track record of goods or services provided in the target area. FIG. 3A is an example of the track record data. The track record data represents, for example, the contents and the number of goods or services, or if a service provides transportation, the number of people, the number of pieces of luggage, the section of transportation, the amount of sales, etc.

The area data represents the features of a plurality of meshes included in the target area. FIG. 3B is an example of the area data. The area data numerically represents, for example, the number and types (e.g., schools, commercial facilities, hospitals, stations, etc.) of facilities and/or buildings existing in each mesh, the number of people who can stay in each mesh (e.g., the number of beds if the facility is a hospital, the number of students if the facility is a school, the number of people to be accommodated (capacity) if the facility is an entertainment facility, etc.), and so on. In this embodiment, it is assumed that the target area has been divided into a plurality of meshes.

The general data numerically represents dates, days of the week, time zones (times of day), weather, etc. FIG. 3C is an example of the general data. The general data is generally available, regardless of the contents of the goods or services.

Here, note that in the following description, the feature quantities obtained by converting track record data are referred to as track record feature quantities, the feature quantities obtained by converting area data are referred to as area feature quantities, and the feature quantities obtained by converting general data are referred to as general feature quantities.

The control unit 102 is an arithmetic device that controls the functions of the information processing apparatus 100. The control unit 102 can be realized by an arithmetic processing device such as a CPU (Central Processing Unit).

The control unit 102 is composed of four functional modules: a learning unit 1021, a forecasting unit 1022, an export unit 1023, and an import unit 1024. Each functional module may be realized by executing a program stored in the storage unit 101 by the CPU.

The learning unit 1021 builds a classification model and a forecasting model by using data sets that have been collected in the first area and stored in the data storage unit 101B.

The forecasting unit 1022 performs demand forecasting by using the classification model and forecasting model thus built.

The export unit 1023 stores, as external data, parameters held by the classification model and the forecasting model thus built.

The import unit 1024 fetches the parameters stored by the export unit 1023, and reflects them on the classification model and the forecasting model.

By allowing the features of each model to be stored and fetched, it becomes possible to build the models and to start demand forecasting, without going through a learning process.

The specific content of the processing that is performed by each functional module will be described.

Figure 4A:
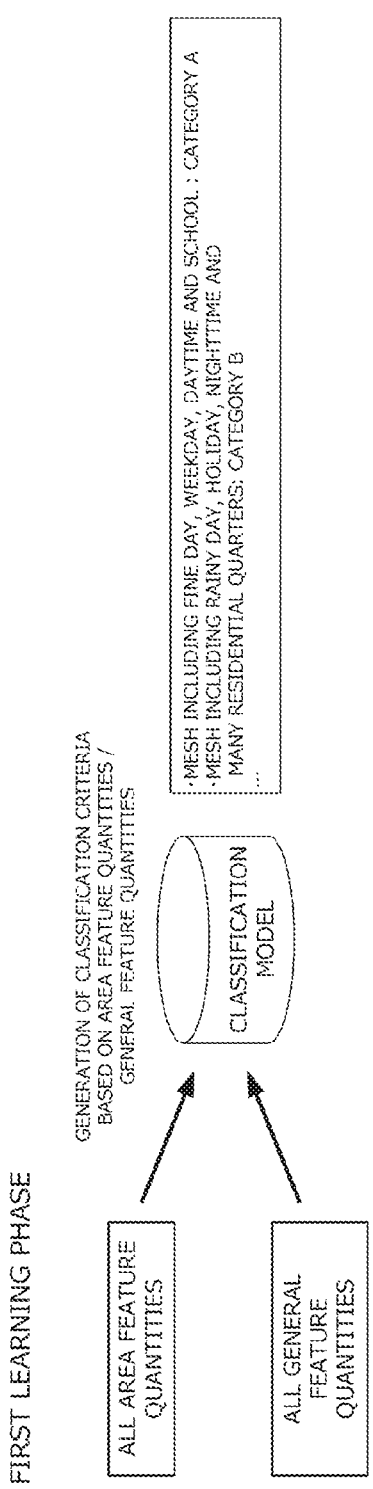
FIG. 4A is a view explaining processings in a first learning phase.
Figure 4B:
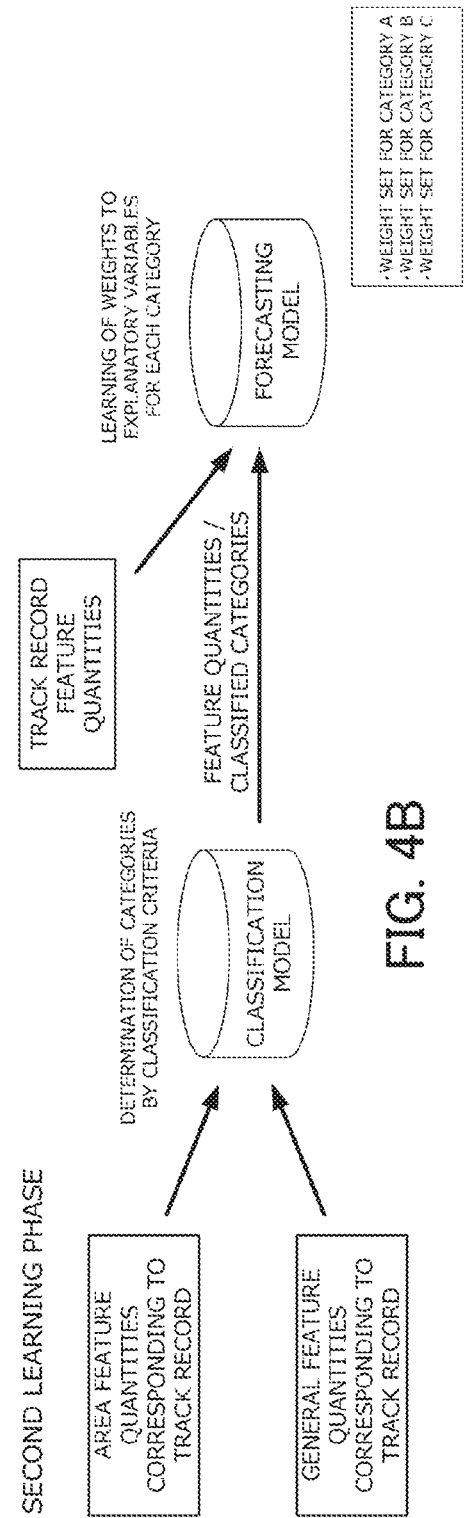
FIG. 4B is a view explaining processings in a second learning phase.

First, a model building method that is performed by the learning unit 1021 will be described with reference to FIGS. 4A and 4B. Here, it is assumed that goods or services have been provided in the first area, and that relevant data (track record data, area data, and general data) have been stored in the data storage unit 101B.

A first learning phase (FIG. 4A) is a phase of building the classification model. In the first learning phase, the classification model is built by using area data and general data corresponding to the first area. Specifically, all area data corresponding to the demand generated in the first area are converted into area feature quantities. In addition, all general data corresponding to the demand generated in the first area are converted into general feature quantities.

The area feature quantities include, for example, the number, type, size and capacity (i.e., the number of people to be accommodated) of buildings in the corresponding meshes, the type, size and total extension of roads, urbanized area or not, and other features of the meshes. In addition, the general feature quantities include, for example, weather, date, day of the week, and time of day.

Then, the classification model is built by using the area feature quantities and the general feature quantities. Classification may be carried out, for example, by clustering. The clustering may be performed, for example, by representing the area feature quantities and the general feature quantities in terms of vectors, and the pairwise distances between the vectors.

Such processing generates classification criteria for classifying the meshes under certain conditions into categories.

A second learning phase (FIG. 4B) is a phase of building the forecasting model. In the second learning phase, the learning of the forecasting model is carried out by using the area feature quantities, track record feature quantities, and general feature quantities.

More specifically, a piece of track record data in the first area is extracted, and area feature quantities and general feature quantities corresponding to this track record data are inputted to the classification model that has been built. Thus, determined categories are output. Then, the forecasting model is trained by converting the target track record data into feature quantities, and inputting them to the forecasting model along with category information.

By repeating this for all the records of the track record data, the weights of the explanatory variables with respect to target variables are updated for each category.

Figure 5:
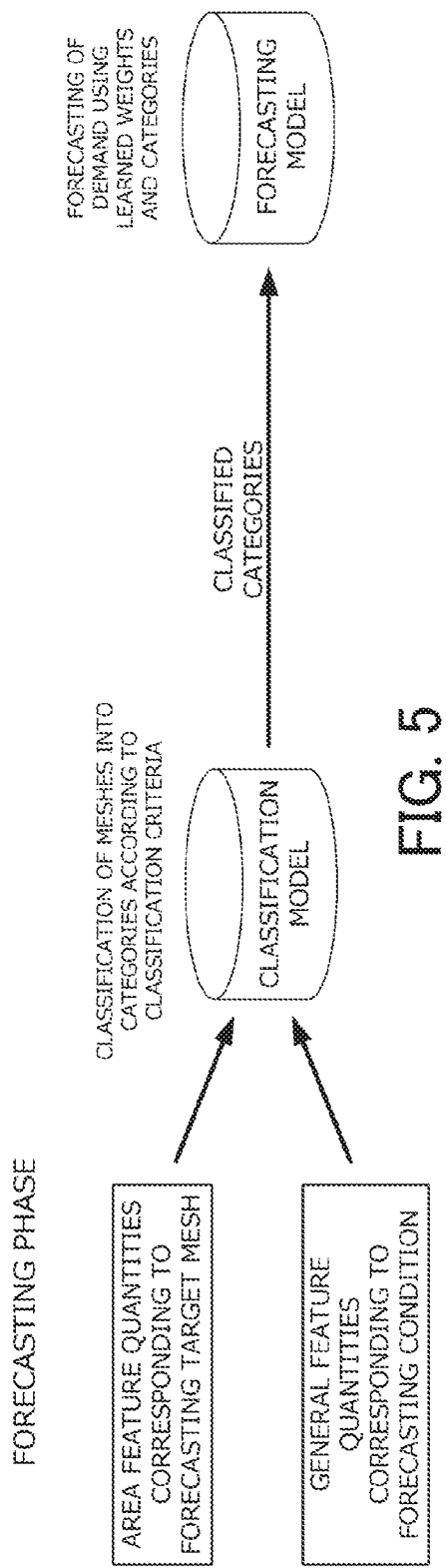
FIG. 5 is a view explaining processing in a forecasting phase.

Now, a method of forecasting demand, which is performed by the forecasting unit 1022, will be described while referring to FIG. 5. Here, it is assumed that area data corresponding to a target mesh (a forecasting target mesh) in which demand is forecasted and general data corresponding to a forecasting condition have been stored in the data storage unit 101B.

The forecasting unit 1022 first inputs the area feature quantities corresponding to the forecasting target mesh and general feature quantities corresponding to the forecasting condition to the built classification model, and obtains categories therefrom as an output. Then, the categories thus obtained are inputted to the forecasting model, and an output obtained therefrom is taken as data on the demand to be forecasted.

Next, the function of the export unit 1023 will be described. The export unit 1023 stores, as classification criteria data, classification criteria possessed by the built classification model, i.e., data indicating that "when a certain feature quantity is inputted, what category is to be associated with the feature quantity". Also, a set of weights possessed by the built forecasting model (i.e., a set of coefficients for the explanatory variables generated for each category) is stored as parameter data.

Then, the function of the import unit 1024 will be described. The import unit 1024 fetches the stored classification criteria data, and applies them to the classification model of the initial state. In this way, it is possible to obtain a model equivalent to the classification model immediately after the first learning phase has been performed. In addition, the import unit 1024 fetches the stored parameter data, and applies them to the forecasting model of the initial state. As a result, it is possible to obtain a model equivalent to the forecasting model immediately after the second learning phase has been performed.

By allowing data to be exported from and/or imported to the classification and forecasting models, it is possible to replicate the model learned by the data generated in the first area.

Figure 6:
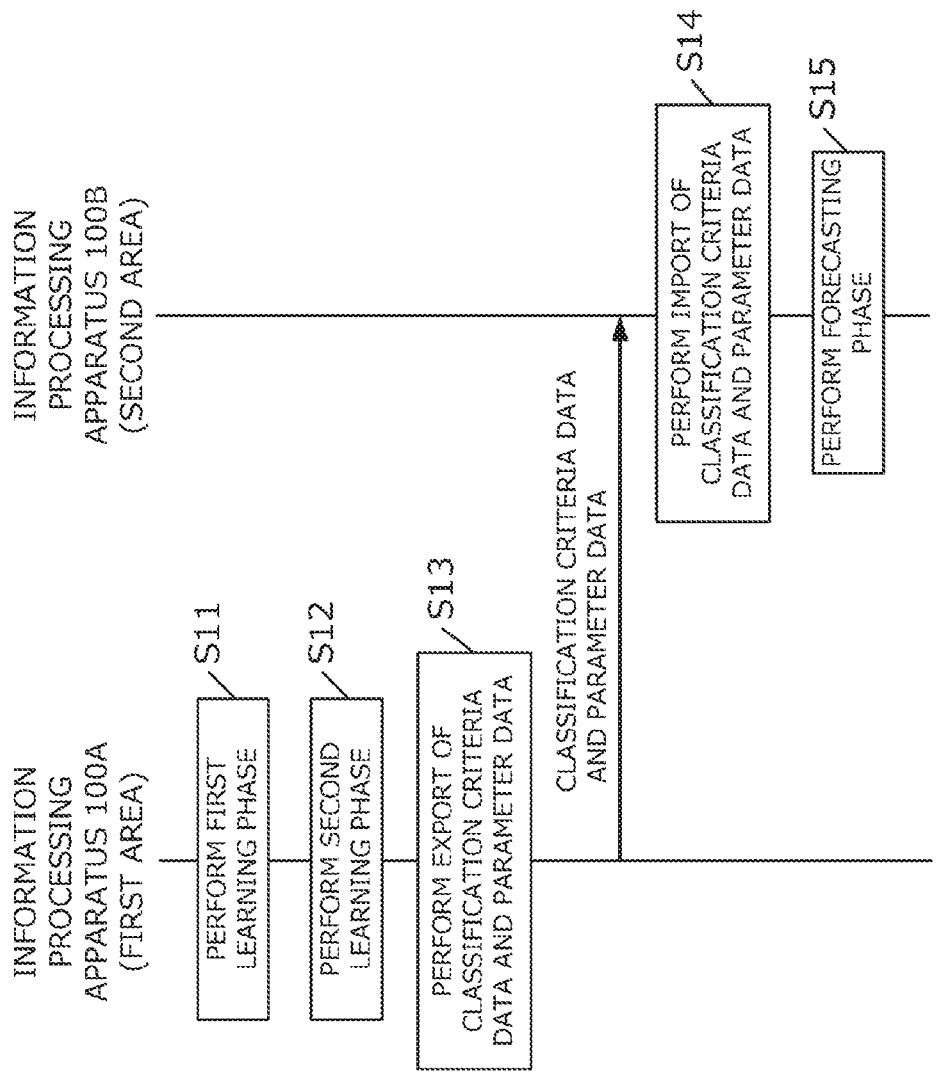
FIG. 6 is a view illustrating data flow between information processing apparatuses.

Now, reference will be made to the processing of forecasting the demand in the second area where there is no track record data, based on the track record data generated in the first area, while referring to FIG. 6 which is a flowchart of a processing flow. An information processing apparatus 100A illustrated in FIG. 6 is an apparatus configured to perform demand forecasting for the first area, and an information processing apparatus 100B is an apparatus configured to perform demand forecasting for the second area. Both of the apparatuses may be arranged geographically separated from each other, or may be connected to each other for communication via a network or the like.

The processings of step S11 through S13 are performed by the information processing apparatus 100A.

First, in step S11, the learning unit 1021 performs the first learning phase. This results in building a classification model.

Then, in step S12, the learning unit 1021 performs the second learning phase. Thus, a forecasting model is built.

Subsequently, in step S13, the export unit 1023 outputs classification criteria data and parameter data. As mentioned above, the classification criteria data is data representing the classification criteria of the classification model. Also, the parameter data is data representing a set of weights for each category possessed by the forecasting model.

The classification criteria data and parameter data outputted are transmitted to the information processing apparatus 100B.

The processings of steps S14 and S15 are performed by the information processing apparatus 100B.

First, in step S14, the import unit 1024 applies the received classification criteria data to the classification model of the initial state. Thus, the classification model utilized by the information processing apparatus 100B becomes able to perform category classification according to the same criteria as the classification model utilized by the information processing apparatus 100A.

In addition, the import unit 1024 applies the received parameter data to the forecasting model of the initial state. As a result, the forecasting model utilized by the information processing apparatus 100B becomes able to weight the explanatory variables according to the same parameters (coefficients) as those in the forecasting model utilized by the information processing apparatus 100A.

Thereafter, in step S15, the forecasting unit 1022 performs the forecasting phase by using the classification model and the forecasting model thus built.

According to the configuration described above, it is possible to match the criteria utilized when the information processing apparatus 100A performs category classification with the criteria utilized when the information processing apparatus 100B performs category classification. Because the forecasting model generates parameters (a weight set) for each category, it is not possible to correctly forecast the demand simply by copying the parameters, which are the learning result, from the information processing apparatus 100A to the information processing apparatus 100B. However, according to this embodiment, the classification criteria in both of the apparatuses 100A, 100B can be matched, it is possible to forecast the demand accurately even in the second area where there is no track record data.

Second Embodiment

In the above-mentioned first embodiment, the information processing apparatus 100B builds the forecasting model by making use of the parameter data obtained from the information processing apparatus 100A. On the other hand, after a service is launched in the second area, track record data is generated in the second area, so it will become possible to build a forecasting model by utilizing the track record data thus generated.

In a second embodiment of the present disclosure, in addition to the forecasting model generated in the first embodiment, a new forecasting model is generated by using the track record data generated in the second area, and both of the forecasting models are switched over from one to the other.

In the following, the forecasting model generated by the information processing apparatus 100A in step S12 is referred to as a first forecasting model, and the forecasting model generated by the information processing apparatus 100B in step S14 is referred to as a second forecasting model. Also, a new forecasting model generated by the information processing apparatus 100B in this second embodiment is referred to as a third forecasting model. The first through third forecasting models in this embodiment also can be referred as first through third forecasting models.

Figure 7:
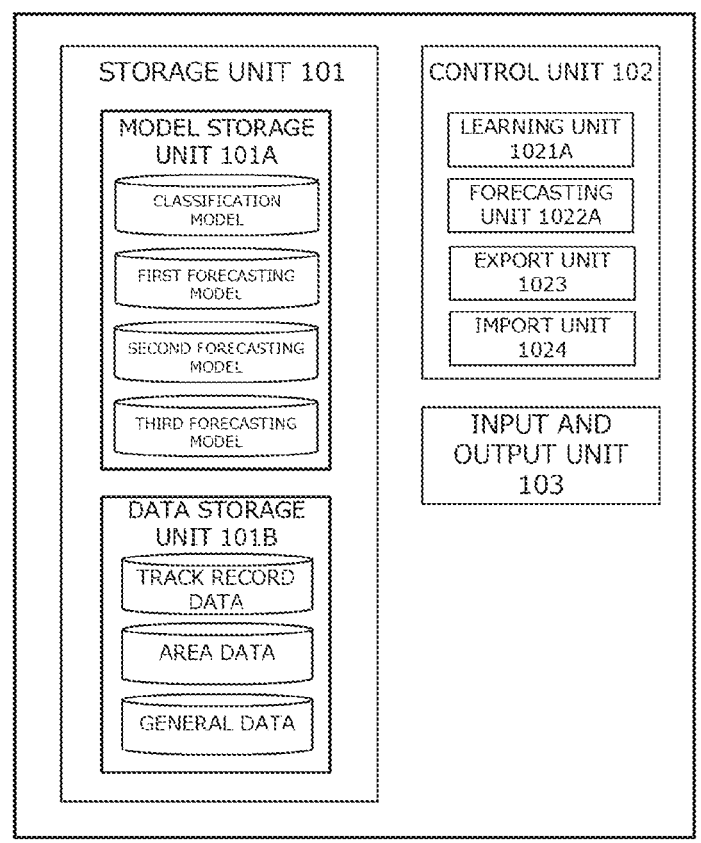
FIG. 7 is a schematic configuration view of an information processing apparatus according to a second embodiment of the present disclosure.

FIG. 7 is a block diagram schematically illustrating an example of the configuration of the information processing apparatus 100 according to the second embodiment. The information processing apparatus 100 according to the second embodiment is configured so that the model storage unit 101A can store the first forecasting model, the second forecasting model and the third forecasting model.

In addition, in the second embodiment, a learning unit 1021A generates the third forecasting model based on the track record data, in addition to the second forecasting model generated by importing.

Further, the forecasting unit 1022A switches between demand forecasting using the second forecasting model, and demand forecasting using the third forecasting model, based on the amount of track record data accumulated.

In cases where the amount of track record data accumulated in the second area is small, it is possible to perform forecasting with higher accuracy by using the second forecasting model than by using the third forecasting model. On the other hand, in cases where there is enough track record data accumulated in the second area, it is considered to be more accurate to use the third forecasting model based on track record data accumulated in the second area (actual area) than the second forecasting model based on the track record data in the first area.

For this reason, in the second embodiment, in cases where the amount of track record data accumulated in the second area is below a threshold value, i.e., in cases where the degree of learning of the third forecasting model is below a predetermined value, the forecasting unit 1022A performs demand forecasting by using the second forecasting model. On the other hand, in cases where the amount of track record data accumulated in the second area exceeds the threshold value, i.e., in cases where the degree of learning of the third forecasting model exceeds the predetermined value, the forecasting unit 1022A performs demand forecasting by using the third forecasting model.

Figures 8A, 8B:
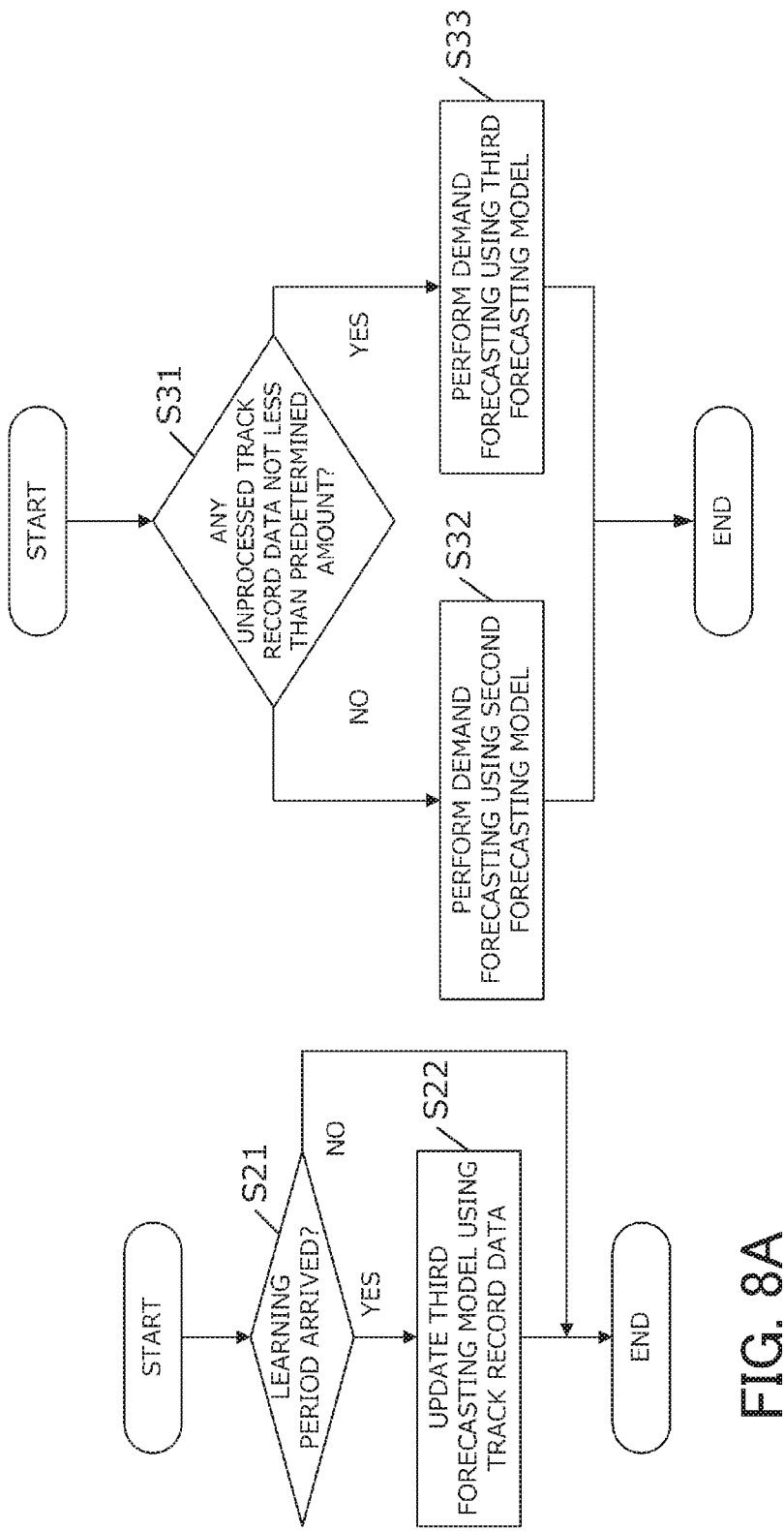
FIG. 8A is a flowchart of the processings that is performed by a learning unit in the second embodiment of the present disclosure.
FIG. 8B is a flowchart of the processings that is performed by a forecasting unit in the second embodiment of the present disclosure.

FIG. 8A is a flow chart of the processing that is performed by the learning unit 1021A. The processing is periodically performed by the learning unit 1021A.

First, in step S21, it is determined whether a learning period has arrived. For example, the arrival of the learning period is determined by using as a trigger the fact that a predetermined amount of time has passed since the last learning, or that a predetermined amount of track record data has been newly obtained, but it is not limited to this. When the learning period has arrived, then in step S22, the second learning phase is performed by using the accumulated track record data (the track record data generated in the second area) to update the third forecasting model. Here, note that the classification model is not updated.

FIG. 8B is a flowchart of the processing that is performed by the forecasting unit 1022A. This processing is carried out by the forecasting unit 1022A at the timing of performing the demand forecasting.

First, in step S31, it is determined whether a predetermined amount or more of track record data (the track record data generated in the second area) has been accumulated in the data storage unit 101B. The amount of track record data accumulated can be determined, for example, by the number of records corresponding to the actual or track record generated within the second area.

In cases where a negative determination is made in step S31, the processing proceeds to step S32, in which demand forecasting is carried out by using the second forecasting model.

On the other hand, in cases where an affirmative determination is made in step S31, the processing proceeds to step S33, in which demand forecasting is performed by using the third forecasting model.

Here, note that in this example, in step S31, the determination is made based on the amount of track record data, but it may be made based on whether the degree of learning (e.g., the number of times of learning) with the track record data generated in the second area is greater than or equal to a predetermined value.

According to such a configuration, it is possible to further improve accuracy in demand forecasting by using the track record data generated in the second area.

Modification of the Second Embodiment

Figure 9:
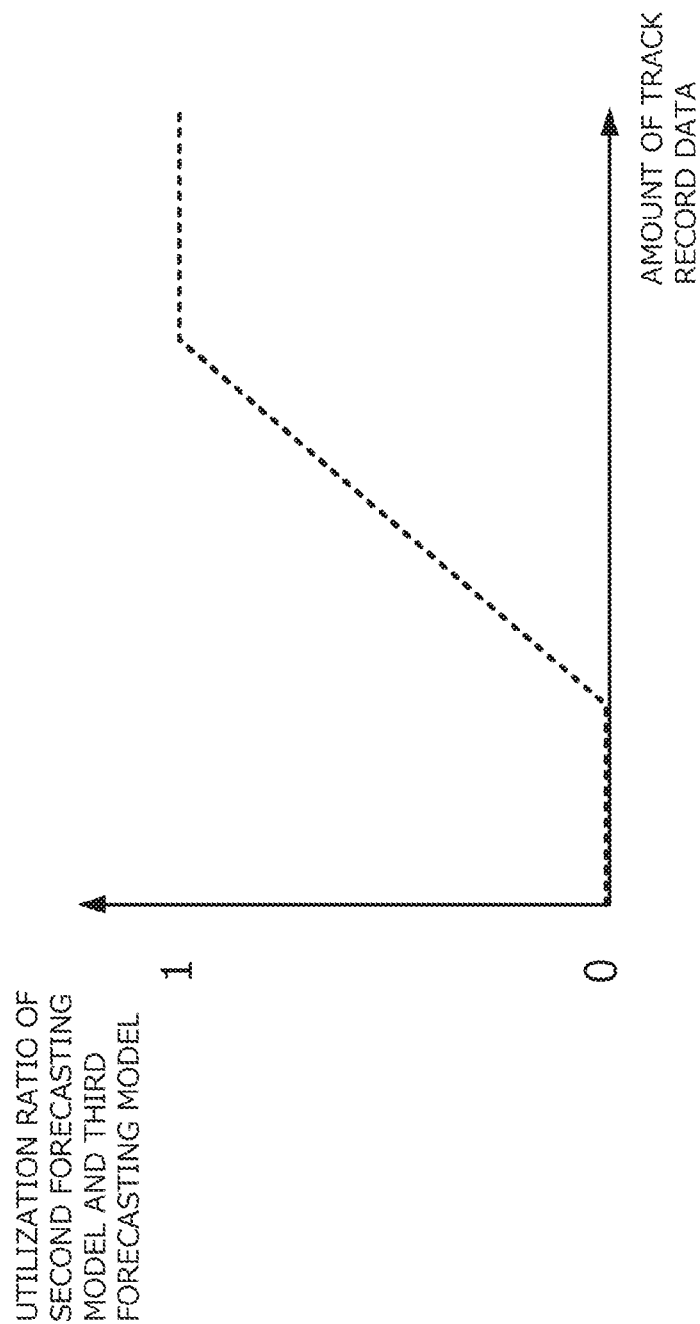
FIG. 9 is a view explaining a modification of the second embodiment of the present disclosure.

In the above-mentioned second embodiment, the threshold value is used to determine whether to utilize the second forecasting model or the third forecasting model, but both of these models may be used together to perform demand forecasting. For example, as illustrated in FIG. 9, the utilization ratio of the second forecasting model and the third forecasting model may be dynamically changed according to the amount of track record data collected in the second area.

Other Modifications

The above-mentioned embodiments and modification are only some examples, and the present disclosure can be implemented while being changed or modified suitably without departing from the spirit and scope of the disclosure.

For example, the processings, units, devices and the like explained in this disclosure can be implemented in various combinations thereof, as long as technical inconsistency does not occur.

In addition, the processing(s) explained as carried out by a single device may be carried out by a plurality of devices. Alternatively, the processing(s) explained as carried out by different devices may be carried out by a single device. In a computer system, whether each function thereof is achieved by what kind of hardware configuration (server configuration) can be changed in a flexible manner.

The present disclosure can also be achieved by supplying a computer program to a computer which implements the functions explained in the above-mentioned embodiments and modification, and by reading out and executing the program by one or more processors of the computer. Such a computer program may be supplied to the computer by a non-transitory computer readable storage medium that can be connected with a system bus of the computer, or may be supplied to the computer through a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, any type of medium suitable for storing electronic commands.

What is claimed is:

1. An information processing method which is performed by an information processing apparatus for forecasting demand for a service provided by a mobile vehicle, the method comprising:
    a classification step of classifying a plurality of unit regions included in a first area into a plurality of categories, respectively, by using a first classification model performing clustering, the first area being an area in which the service has been provided;
    a first building step of building a first demand forecasting model, the first demand forecasting model being a machine learning model, by determining a first set of parameters to be applied to each of the plurality of categories based on training data comprising the classified categories and track record data comprising a track record of having provided the service in the first area;
    a second building step of building a second classification model, the second classification model being a machine learning model, by using classification criteria possessed by the first classification model, and building a second demand forecasting model by using the first set of parameters; and
    a forecasting step of performing demand forecasting in a second area by using the second classification model and the second demand forecasting model, the second area being an area in which the service has not been provided.

2. The information processing method according to claim 1, wherein
    the first classification model performs the classification based on a plurality of factors associated with a facility or a building included in the unit regions.

3. The information processing method according to claim 1, further comprising:
    a third building step of building a third demand forecasting model specific to the second area by determining a second set of parameters to be applied to each of the plurality of categories based on the classified categories and track record data generated in the second area.

4. The information processing method according to claim 3, wherein
    when performing demand forecasting with respect to the second area, a utilization ratio of the second demand forecasting model and the third demand forecasting model is changed based on a degree of accumulation of the track record data generated in the second area.

5. The information processing method according to claim 3, wherein
    in cases where the track record data generated in the second area has been accumulated in a predetermined amount or more, a model to be utilized when performing demand forecasting with respect to the second area is switched over from the second demand forecasting model to the third demand forecasting model.

6. An information processing apparatus for forecasting demand for a service provided by a mobile vehicle, the apparatus including a central processing unit that performs:
    classifying a plurality of unit regions included in a first area into a plurality of categories, respectively, by using a first classification model performing clustering, the first area being an area in which the service has been provided;
    building a first demand forecasting model, the first demand forecasting model being a machine learning model, by determining a first set of parameters to be applied to each of the plurality of categories based on training data comprising the classified categories and track record comprising a track record of having provided the service data in the first area;

building a second classification model, the second classification model being a machine learning model, by using classification criteria possessed by the first classification model, and building a second demand forecasting model by using the first set of parameters; and performing demand forecasting in a second area by using the second classification model and the second demand forecasting model, the second area being an area in which the service has not been provided.

* * * * *